(12) United States Patent
Burrows et al.

(10) Patent No.: US 11,234,424 B2
(45) Date of Patent: Feb. 1, 2022

(54) GARMENTS AND OTHER ITEMS INCORPORATING LINE-CUTTING DEVICES

(71) Applicant: Academy, Ltd., Katy, TX (US)

(72) Inventors: Janine Burrows, Katy, TX (US); Michelle Broussard, Katy, TX (US); Jenna Kerns, Katy, TX (US); Nathan Kinney, Katy, TX (US); Brian Krezinski, Katy, TX (US)

( * ) Notice: Subject to any disclaimer, the term of this patent is extended or adjusted under 35 U.S.C. 154(b) by 33 days.

(21) Appl. No.: 16/354,631

(22) Filed: Mar. 15, 2019

(65) Prior Publication Data
US 2020/0288690 A1    Sep. 17, 2020

(51) Int. Cl.
| *A01K 97/00* | (2006.01) |
| *A45F 5/02* | (2006.01) |
| *A01K 97/24* | (2006.01) |
| *B26B 27/00* | (2006.01) |
| *B26B 11/00* | (2006.01) |

(52) U.S. Cl.
CPC .............. *A01K 97/00* (2013.01); *A01K 97/24* (2013.01); *A45F 5/02* (2013.01); *B26B 11/00* (2013.01); *B26B 27/00* (2013.01); *A45F 2005/023* (2013.01)

(58) Field of Classification Search
CPC ... A01K 97/00; A01K 97/24; A45F 2005/023; A45F 5/02; B26B 27/00; B26B 11/00
See application file for complete search history.

(56) References Cited

U.S. PATENT DOCUMENTS

| 1,374,882 | A |   | 4/1921 | Curtis |
| 2,610,399 | A |   | 9/1952 | Admas et al. |
| 3,987,542 | A |   | 10/1976 | Visco |
| 4,730,409 | A | * | 3/1988 | Mitchell ............... A01K 97/00 30/296.1 |
| 5,182,874 | A | * | 2/1993 | Powell .................. A01K 97/00 30/286 |
| 5,490,624 | A |   | 2/1996 | Yavitz |
| 6,029,387 | A | * | 2/2000 | Swor ..................... A01K 97/00 30/278 |
| 6,125,574 | A |   | 10/2000 | Ganaja et al. |
| 6,629,327 | B2 |   | 10/2003 | Adams |
| 6,846,123 | B1 |   | 1/2005 | Bedford |

(Continued)

FOREIGN PATENT DOCUMENTS

CN          2044148 U       6/2015

OTHER PUBLICATIONS

International Search Report and Written Opinion for PCT/US20/22558 (dated Sep. 2, 2020).

(Continued)

*Primary Examiner* — Hwei-Siu C Payer
(74) *Attorney, Agent, or Firm* — Klemchuk LLP

(57) ABSTRACT

Line cutters that may be incorporated into other items, such as garments or paddles. A garment that incorporates a line-cutting trim component allows a wearer to easily cut line or cord while fishing or engaging in other activities. The trim component includes a housing with an opening, and a line cutter partially extending into the opening. The trim component can be secured to the garment using a rivet, or sewn onto the garment. In another example, a paddle may incorporate a line cutter as part of a spring clip used to secure together the tubes of a multi-piece paddle.

13 Claims, 23 Drawing Sheets

(56) References Cited

U.S. PATENT DOCUMENTS

| | | | |
|---|---|---|---|
| 7,540,094 B2 | 6/2009 | Okada | |
| 9,032,629 B2 | 5/2015 | Bermes et al. | |
| 9,446,528 B1* | 9/2016 | Zahorski | B26B 27/007 |
| D835,750 S | 12/2018 | Zahorski | |
| 2003/0173390 A1* | 9/2003 | Smith | A01K 97/06 |
| | | | 224/604 |
| 2005/0274026 A1 | 12/2005 | Lee | |
| 2006/0163295 A1* | 7/2006 | Badillo | A45F 5/021 |
| | | | 224/269 |
| 2008/0263741 A1 | 10/2008 | Tempini | |
| 2009/0235428 A1 | 9/2009 | Horne | |
| 2012/0055962 A1* | 3/2012 | Lee | A45F 5/02 |
| | | | 224/191 |
| 2014/0026297 A1 | 1/2014 | Enes | |
| 2015/0273712 A1 | 10/2015 | Bermes et al. | |
| 2016/0059429 A1* | 3/2016 | Mayes | B26B 29/02 |
| | | | 30/151 |
| 2017/0246508 A1 | 8/2017 | Zedel | |
| 2019/0184588 A1 | 6/2019 | Keelan et al. | |
| 2020/0288690 A1* | 9/2020 | Burrows | B26B 27/00 |

OTHER PUBLICATIONS

Binlot, Ann, "Channel James Bond With These Butterfly Knife Cufflinks," The Manual, May 4, 2013.

* cited by examiner

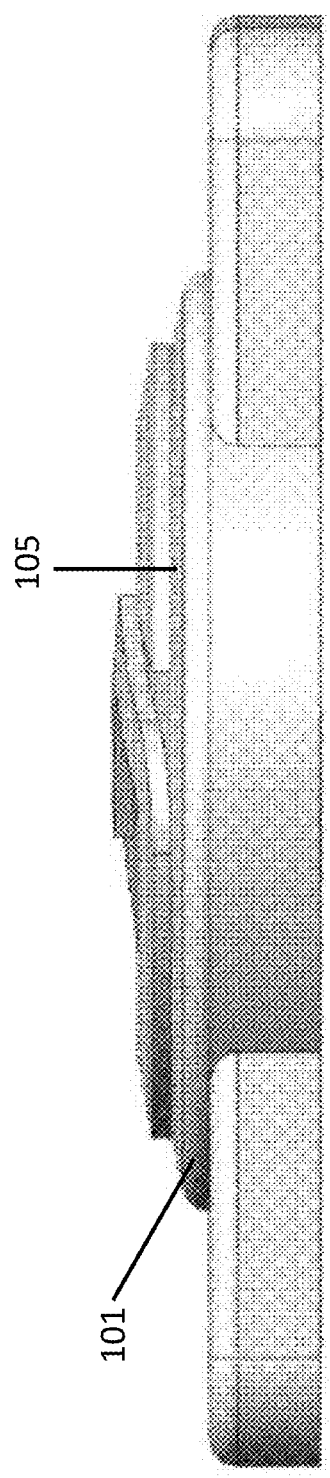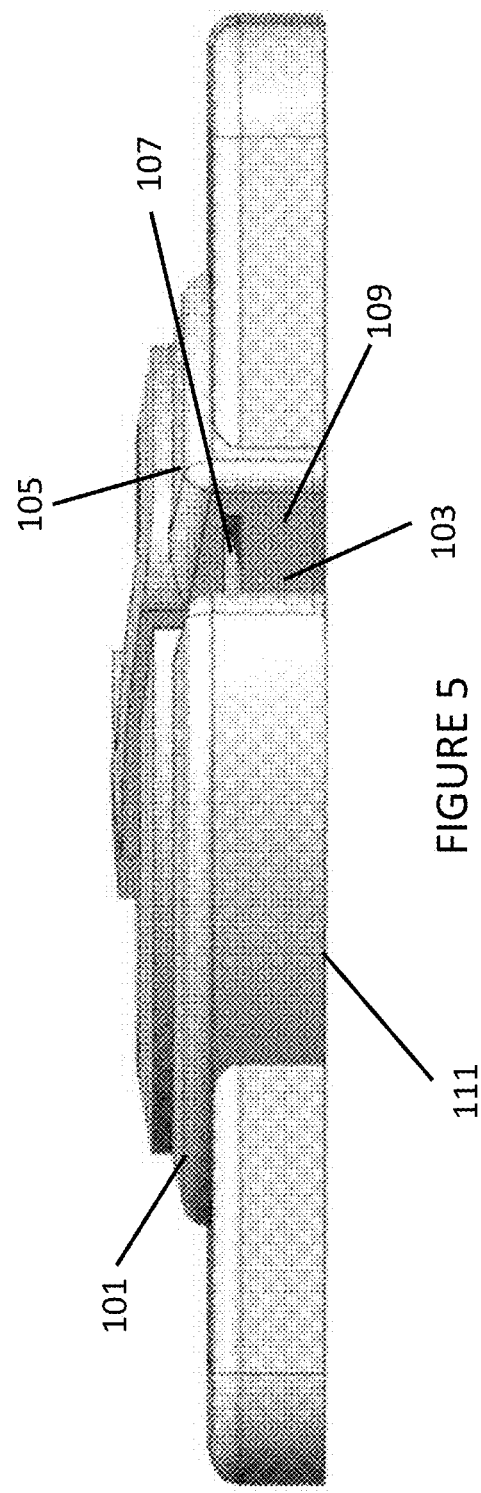
FIGURE 4
FIGURE 5

GARMENTS AND OTHER ITEMS INCORPORATING LINE-CUTTING DEVICES

RELATED FIELDS

Garments (such as shirts, pants, or shorts) and other items with incorporated line-cutting components.

BACKGROUND

When fishing and engaging in other activities, it can be helpful to have a line cutter that is easily accessible.

SUMMARY

This patent describes garments with incorporated line-cutting trim components that provide the garment's wearer with an easy way to cut fishing line and other types of line or string, when fishing and engaging in other activities where it is helpful to have easy access to a line cutter. This patent also describes other items with incorporated line-cutting components, such as a paddle.

BRIEF DESCRIPTION OF DRAWINGS

FIG. 4 shows the line-cutting trim component of FIG. 3, from a right side view.

FIG. 5 shows the line-cutting trim component of FIG. 3, from a left side view.

DETAILED DESCRIPTION OF DRAWINGS

Figure 1:
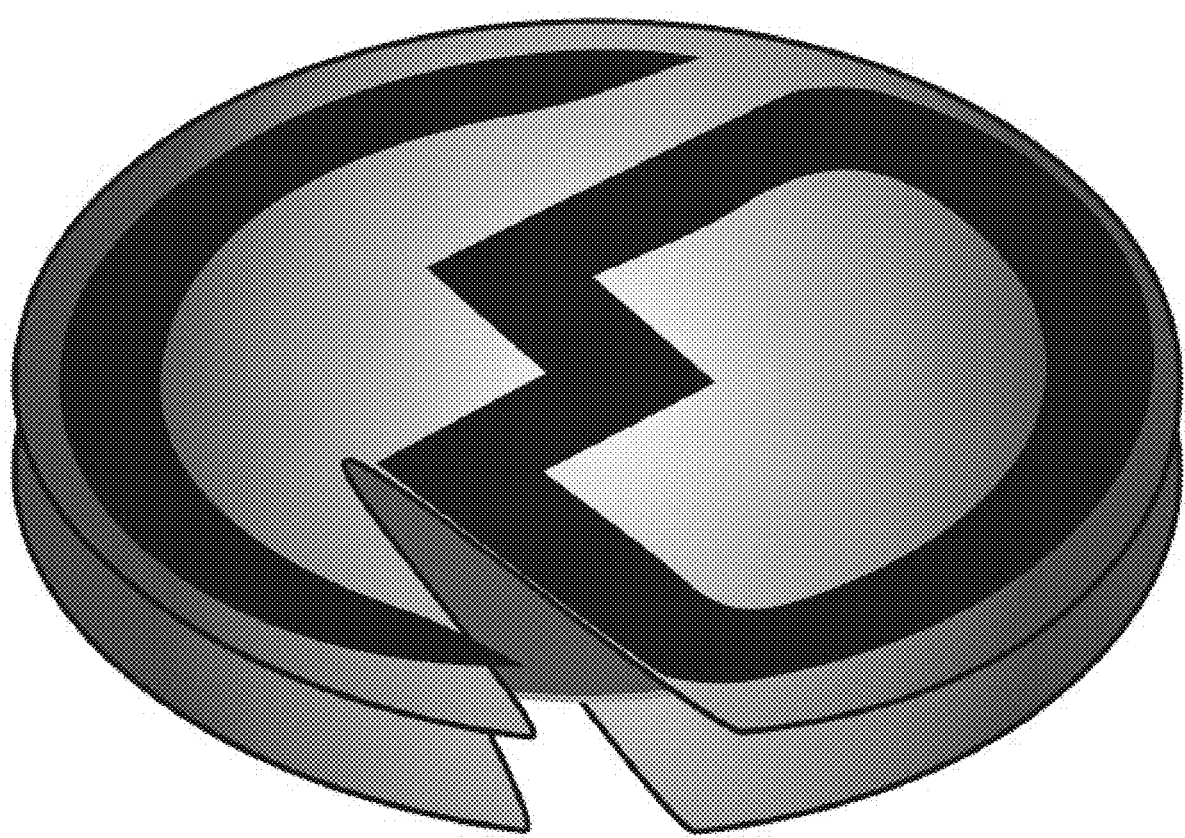
FIG. 1 shows an example of a line-cutting trim component, from a perspective, upper view.
Figure 2:
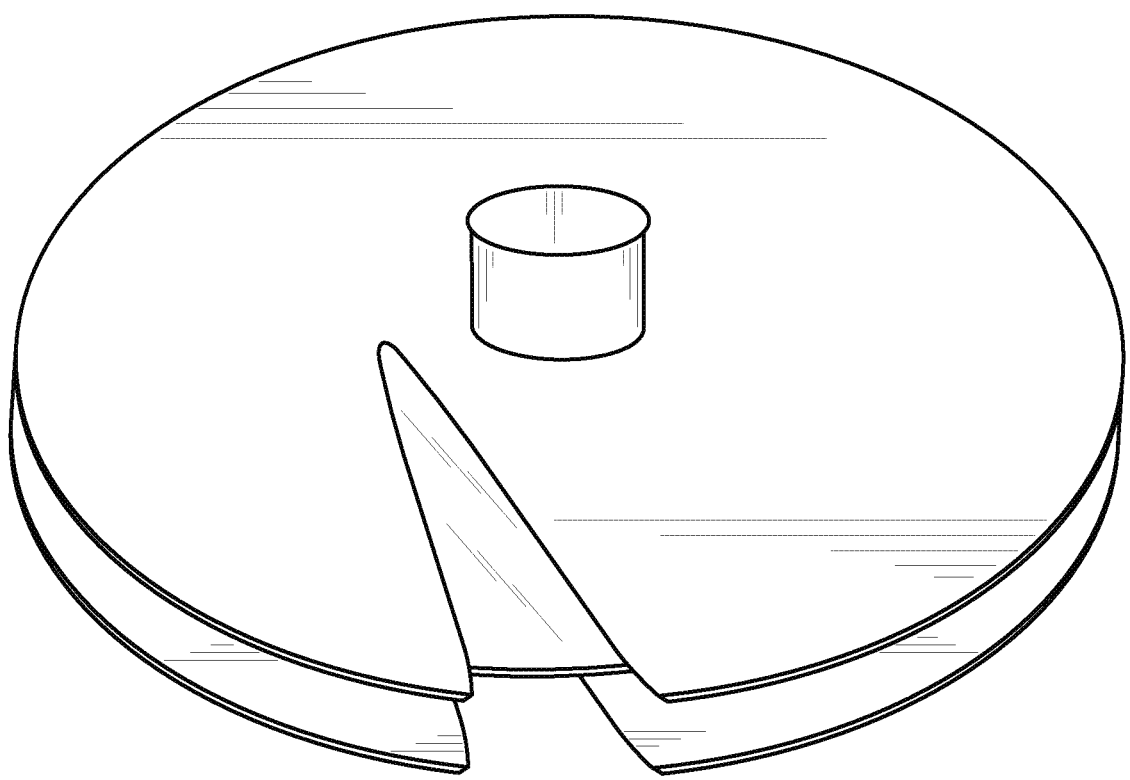
FIG. 2 shows the line-cutting trim component of FIG. 1, from a perspective, lower view.
Figure 3:
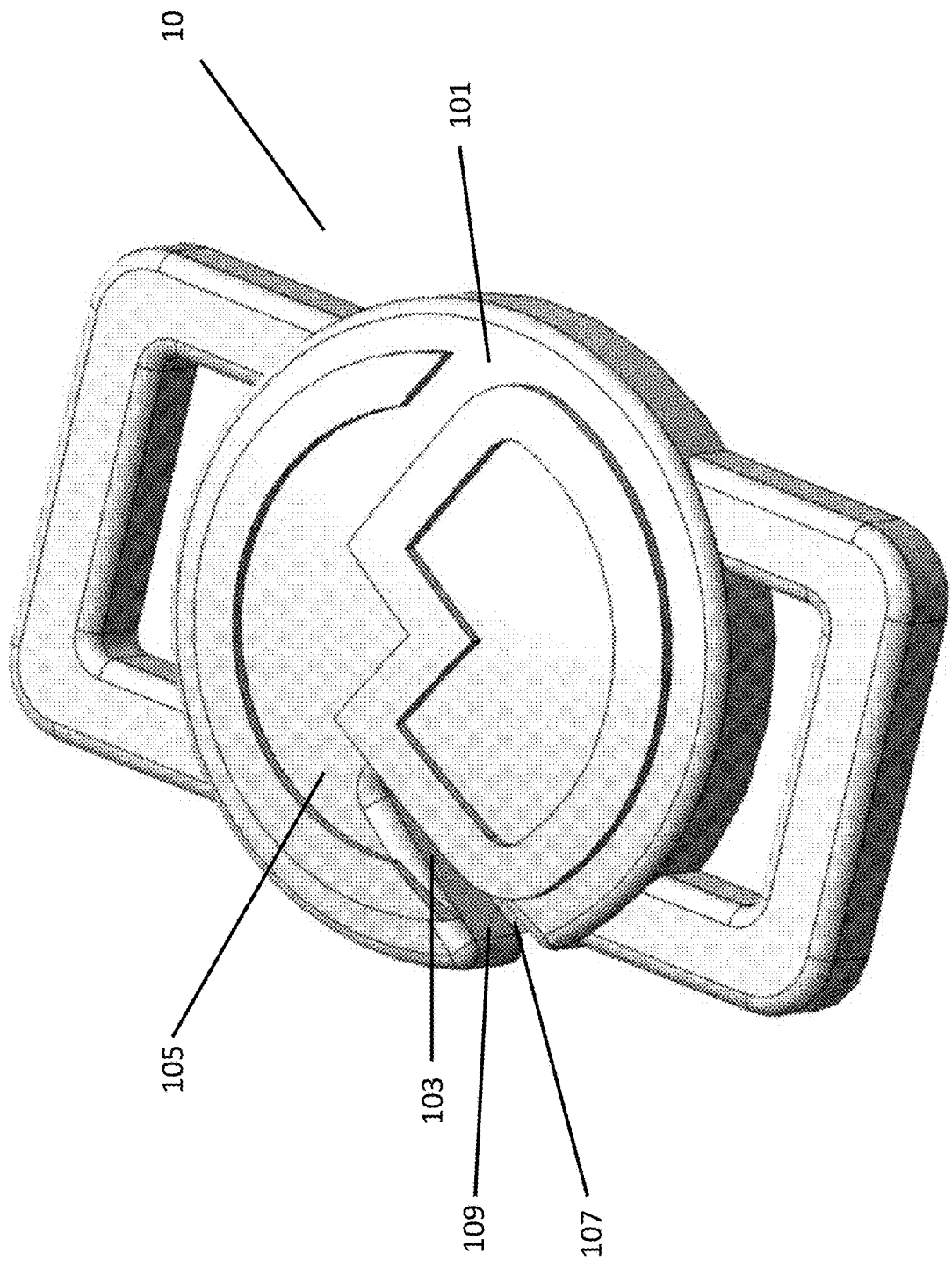
FIG. 3 shows another example of a line-cutting trim component, from a perspective, upper view.
Figure 6:
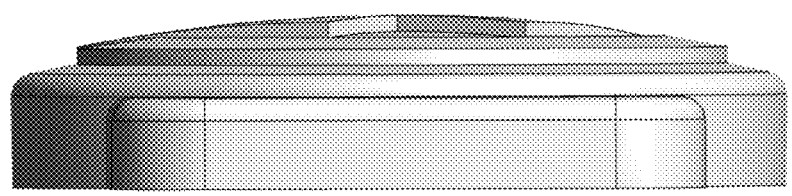
FIG. 6 shows the line-cutting trim component of FIG. 3, from a top side view.
Figure 7:
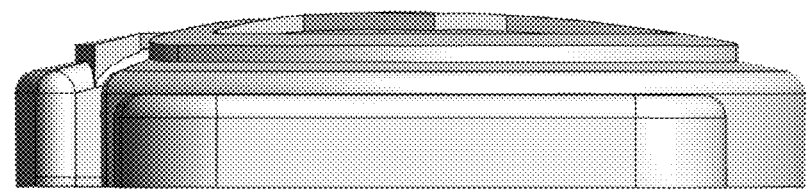
FIG. 7 shows the line-cutting trim component of FIG. 3, from a bottom side view.
Figure 8:
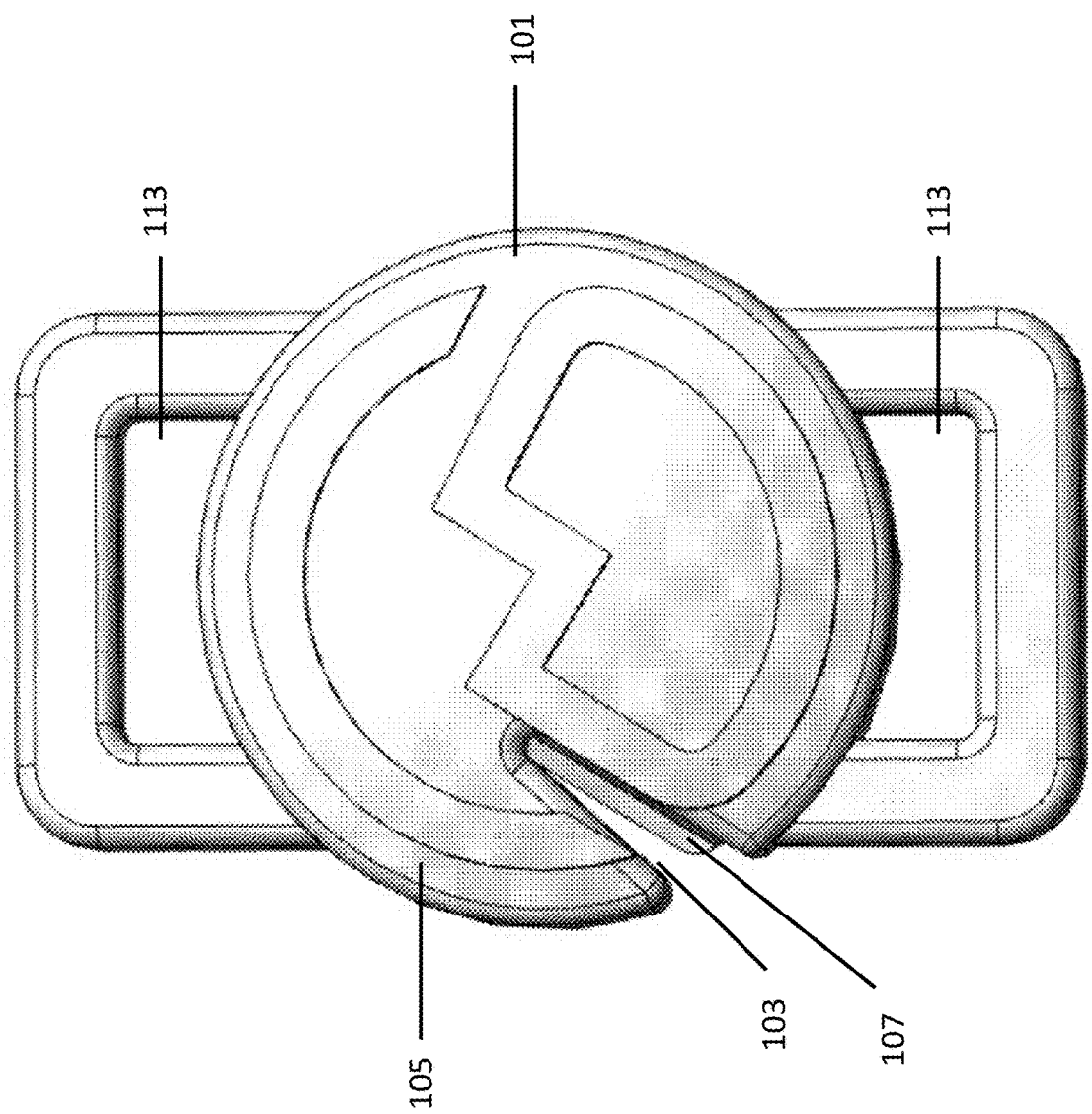
FIG. 8 shows the line-cutting trim component of FIG. 3, from a front view.

FIGS. 1 and 2 show one example of a line-cutting trim component for a garment. As shown in these figures, the line-cutting trim component includes a housing, an opening extending into the housing, and a line cutter extending into a portion of the opening. In use, pulling or otherwise introducing under tension a line or cord (e.g., fishing line) into the opening will bring it into contact with the cutter, cutting the line or cord.

The opening in the housing tapers (in this example, as a wedge shape), which may assist in bringing the line or cord into the opening and into contact with the cutter. As shown in the example of FIGS. 1 and 2, the opening extends through the inner, outer, and perimeter surfaces of the housing.

In the example of FIGS. 1 and 2, the line-cutting trim is secured to the garment by passing the post on the inner surface (see FIG. 2) through a hole or opening in the garment body, and securing the component in place using a button tack or rivet.

Figure 9:
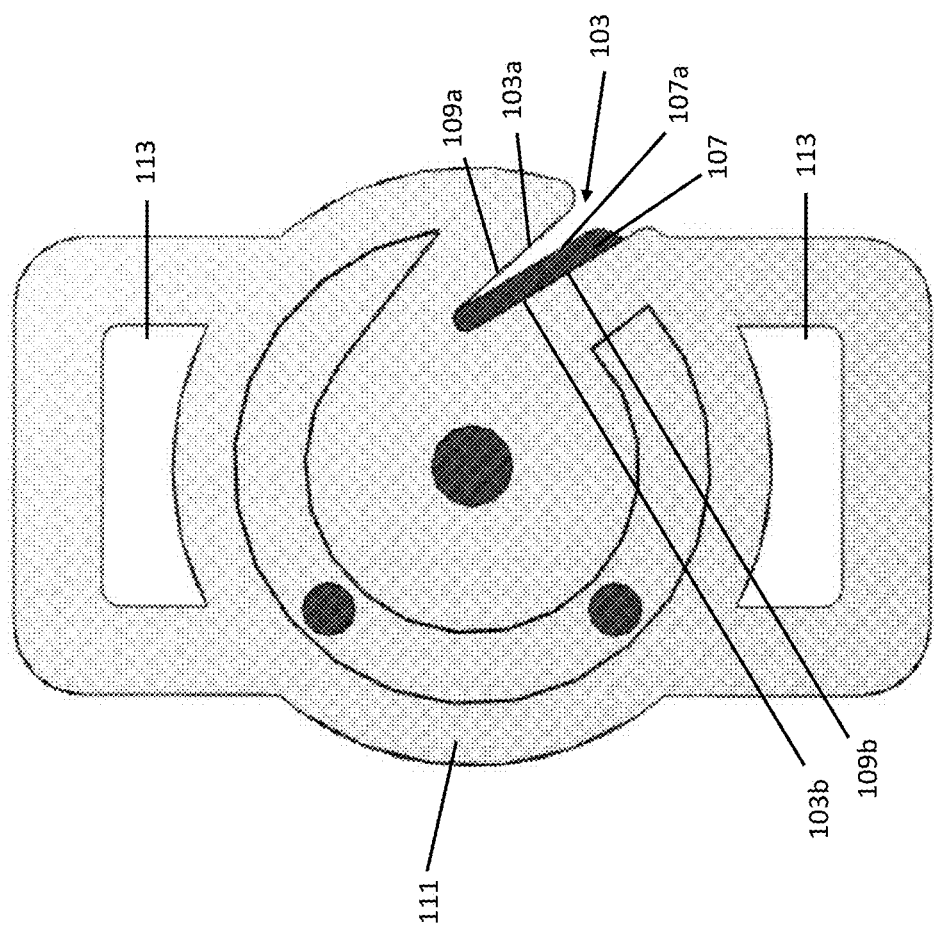
FIG. 9 shows the line-cutting trim component of FIG. 3, from a rear view.
Figure 10:
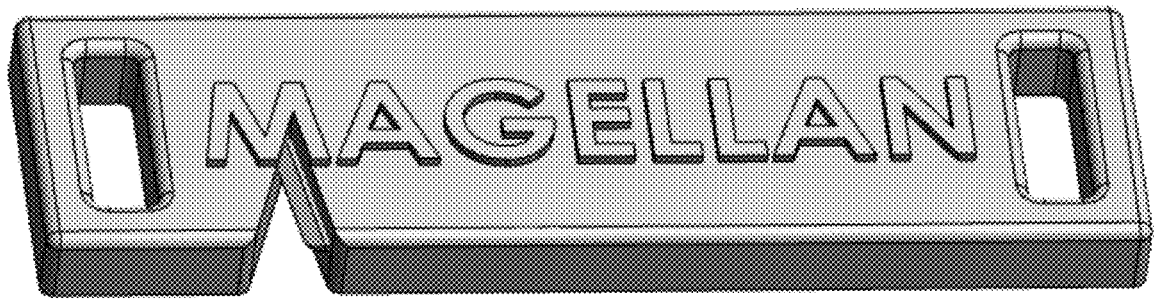
FIG. 10 shows another example of a line-cutting trim component, from a perspective, upper view.
Figure 11:
FIG. 11 shows the line-cutting trim component of FIG. 10, from a bottom side view.
Figure 12:
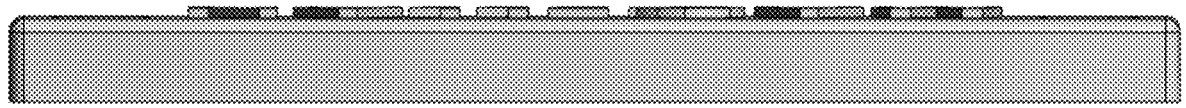
FIG. 12 shows the line-cutting trim component of FIG. 10, from a top side view.
Figure 13:
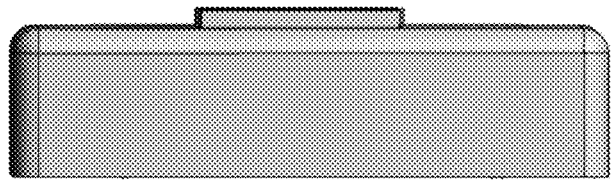
FIG. 13 shows the line-cutting trim component of FIG. 10, from a right side view.
Figure 14:
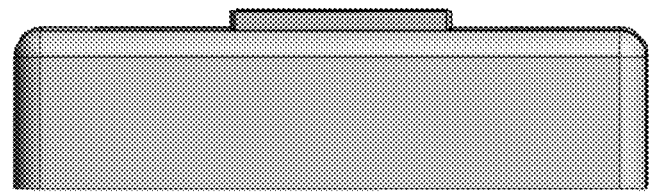
FIG. 14 shows the line-cutting trim component of FIG. 10, from a left side view.
Figure 15:
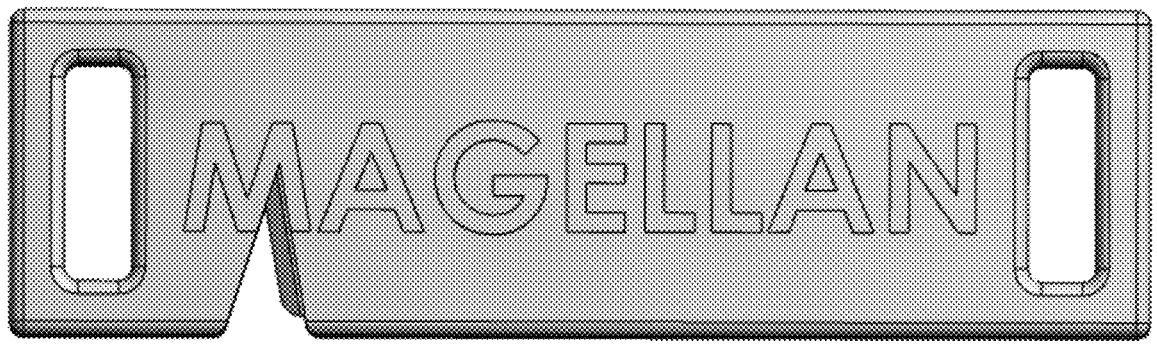
FIG. 15 shows the line-cutting trim component of FIG. 10, from a front view.
Figure 16:
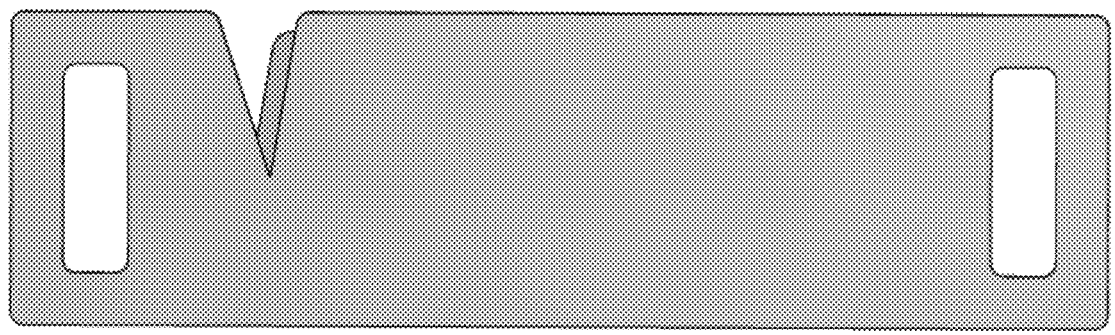
FIG. 16 shows the line-cutting trim component of FIG. 10, from a rear view.

FIGS. 3-9 and 10-16 show additional examples of line-cutting trim components. In these examples, the line-cutting trim is secured to the garment by sewing the component to the garment body. FIGS. 3-9 depict garment trim 10 that may be secured to the garment body. Garment trim 10 may comprise: housing 101, opening 103, and line cutter 107. Housing 101 may comprise outer surface 105 facing away from the garment body, inner surface 111 facing towards the garment body, and perimeter surface 109 extending between the outer and inner surfaces 105 and 111. In an embodiment, the housing 101 has a disk shape, but it should be appreciated that other shapes may be used for housing 101 without departing from the present disclosure. Opening 103 may extend into the housing 101. Opening 103 may be formed in outer surface 105, inner surface 111, and perimeter surface 109. FIG. 9 illustrates two side 109*a* and 109*b* of the perimeter surface 109 taper to with respect to one another and define two sides 103*a* and 103*b* of the opening 103, generally forming a wedge shape for the opening 103. Line cutter 107 can be connected to the first side 109*b* of the perimeter surface 109 and may extend at least partially into opening 103 such that a cutting edge 107*a* of the line cutter 107 faces the second side 109*a* of the perimeter surface 109. Garment trim 10 may be sewn to the garment body. Garment trim housing 101 may include at least two holes 113 where garment trim 10 is sewn to the garment body. Garment trim 10 may secured by all or some subsection of the at least two holes 113 without departing from the present disclosure. Line cutter 107 may be located between the at least two holes 113.

Figure 17:
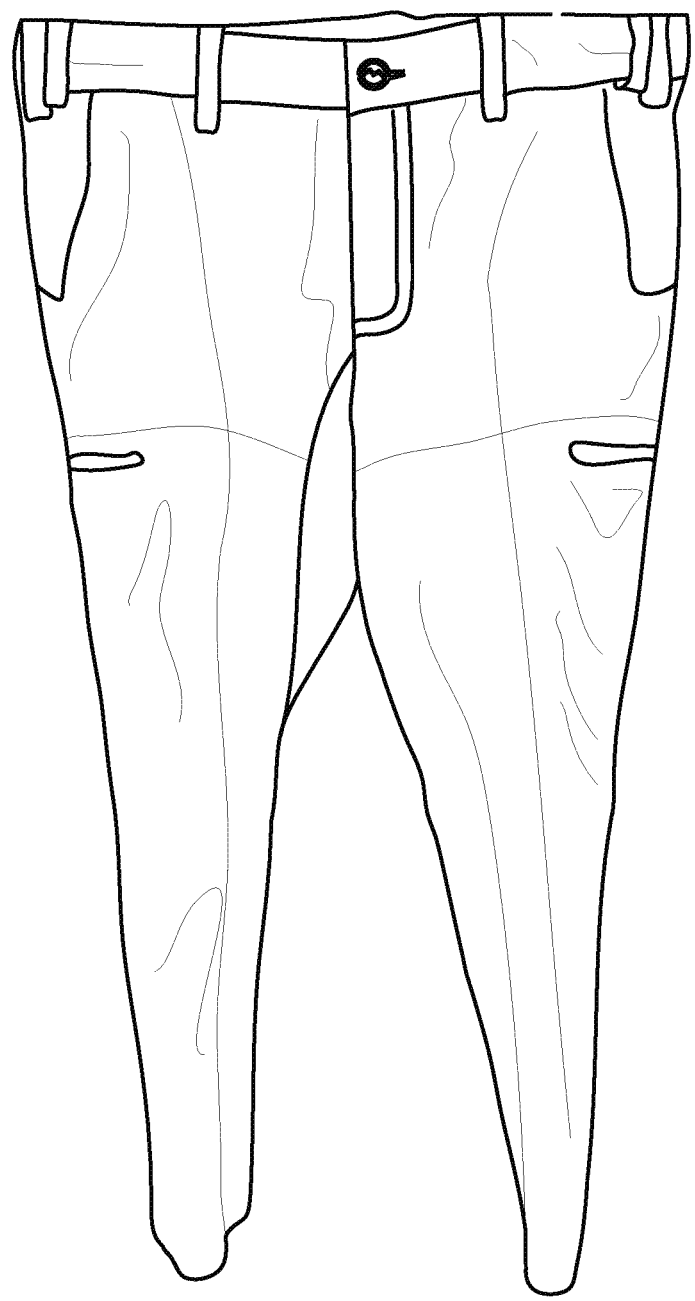
FIG. 17 shows pants incorporating a line-cutting trim component as a button.
Figure 18:
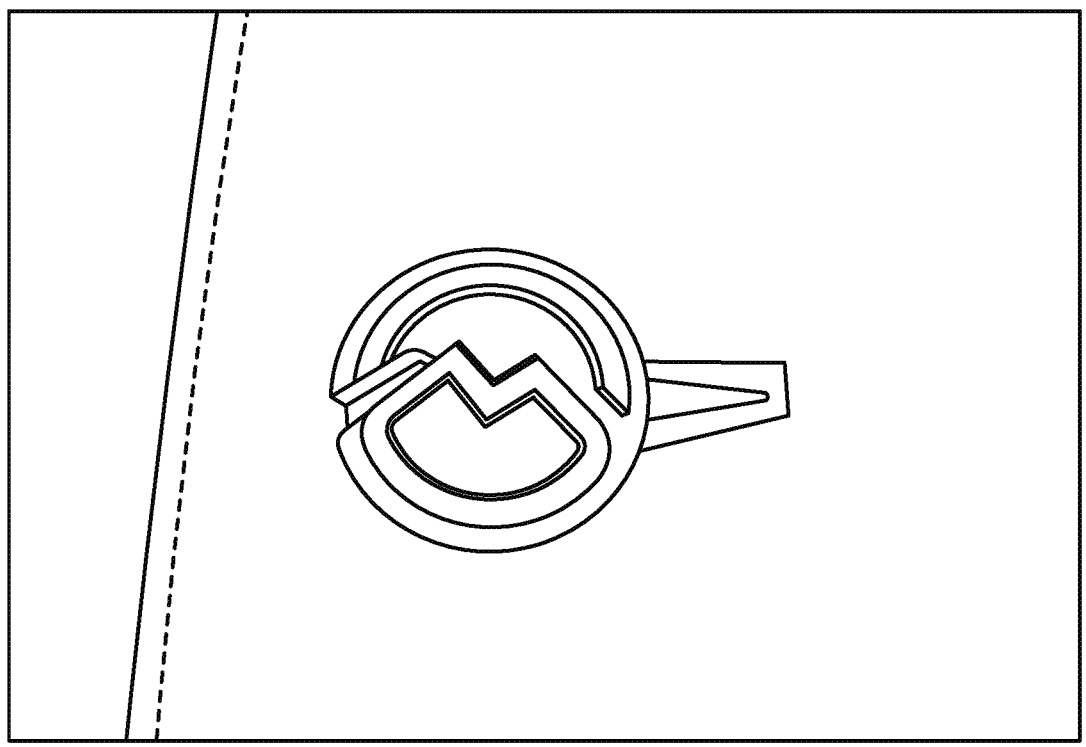
FIG. 18 shows a close up of the line-cutting trim component of FIG. 17.

FIGS. 17-18 show an example of a line-cutting trim component incorporated into a pair of pants. In this example, the line-cutting trim component is a shank button (e.g., utilizing a post extending from the back of the button, such as shown in FIG. 2). As shown in FIG. 18, the shank button is sized and otherwise configured to fit through a button hole in the pants in order to button the pants.

Figure 19:
FIG. 19 shows a shirt incorporating a line-cutting trim component.
Figure 20:
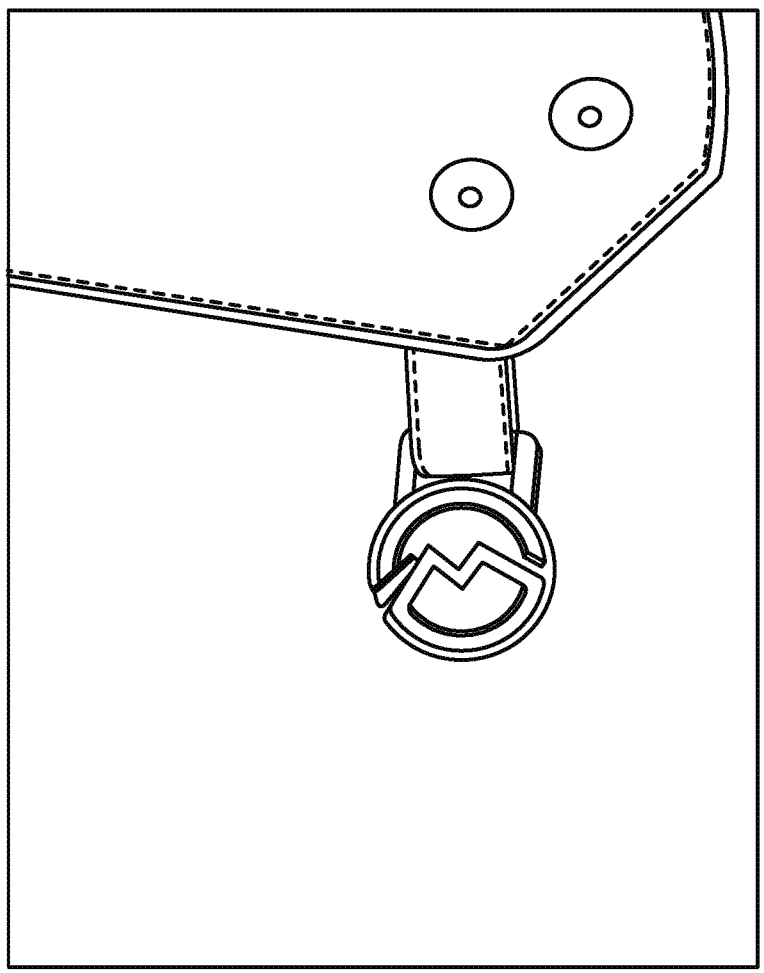
FIG. 20 shows a close up of the line-cutting trim component of FIG. 19.

FIGS. 19-20 show an example of a line-cutting trim component incorporated into a shirt. In this example, the shirt includes a fabric loop sewn into the shirt that loops through an opening of the trim component so that the line-cutting trim component hangs from the fabric loop. By securing the line-cutting trim component to the garment in this manner (or in other manners) the trim component can be swung or otherwise repositioned at least somewhat relative to the main body of the garment.

Figure 21:
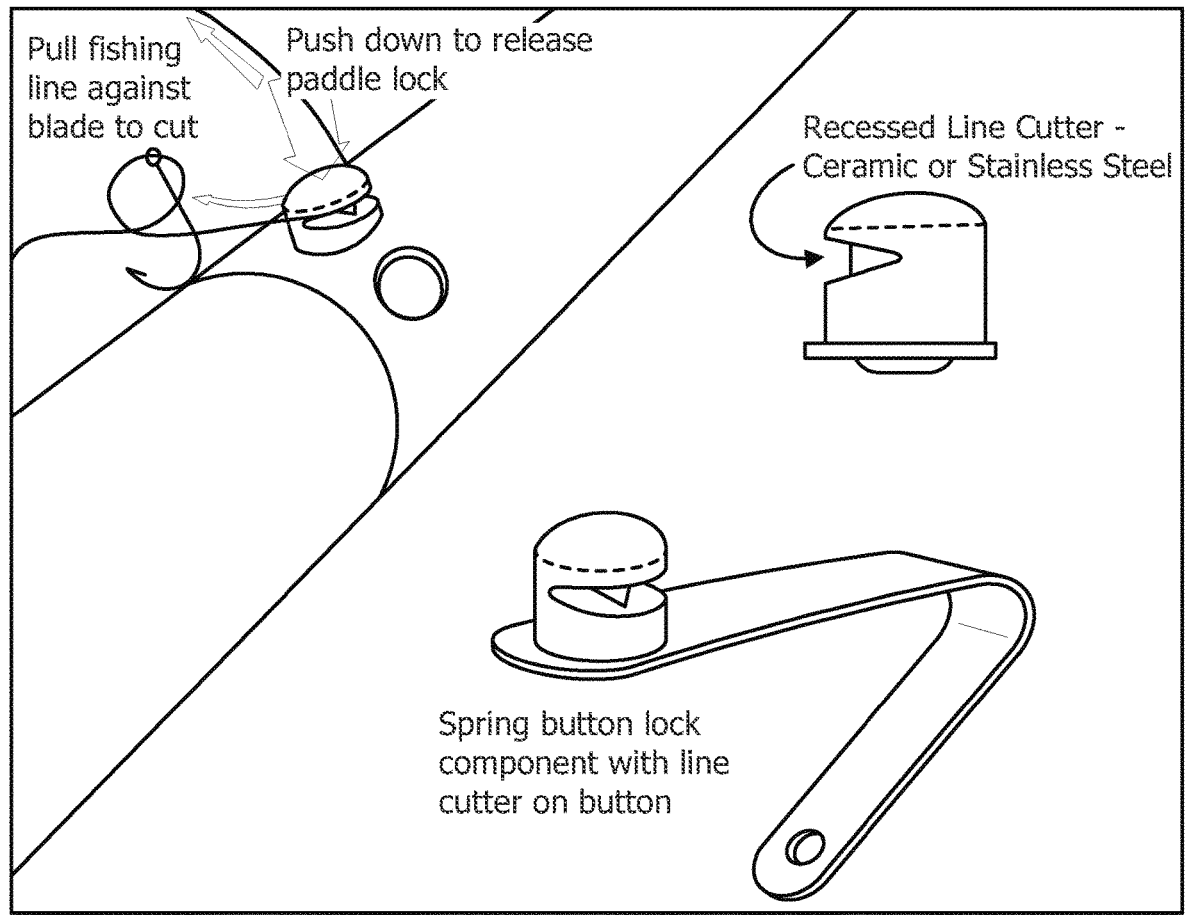
FIG. 21 shows a line-cutting component of a kayak paddle.
Figure 22:
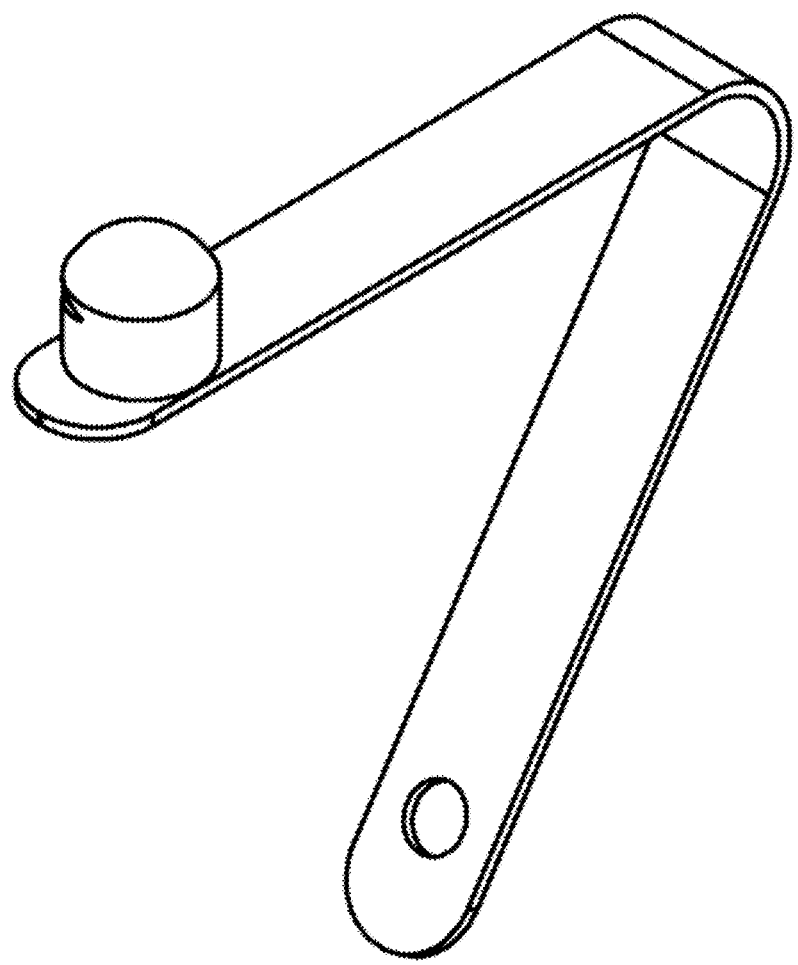
FIG. 22 shows a line-cutting component for a paddle, from a perspective view.
Figure 23:
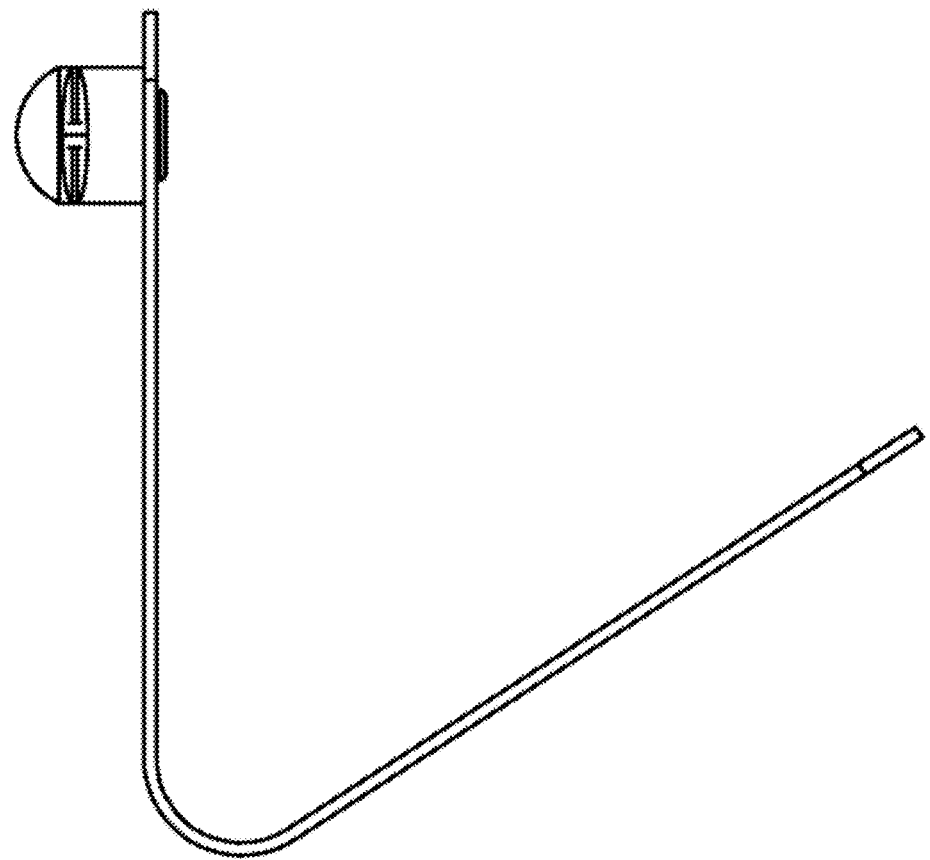
FIG. 23 shows the line-cutting component of FIG. 22, from a side view.
Figure 24:
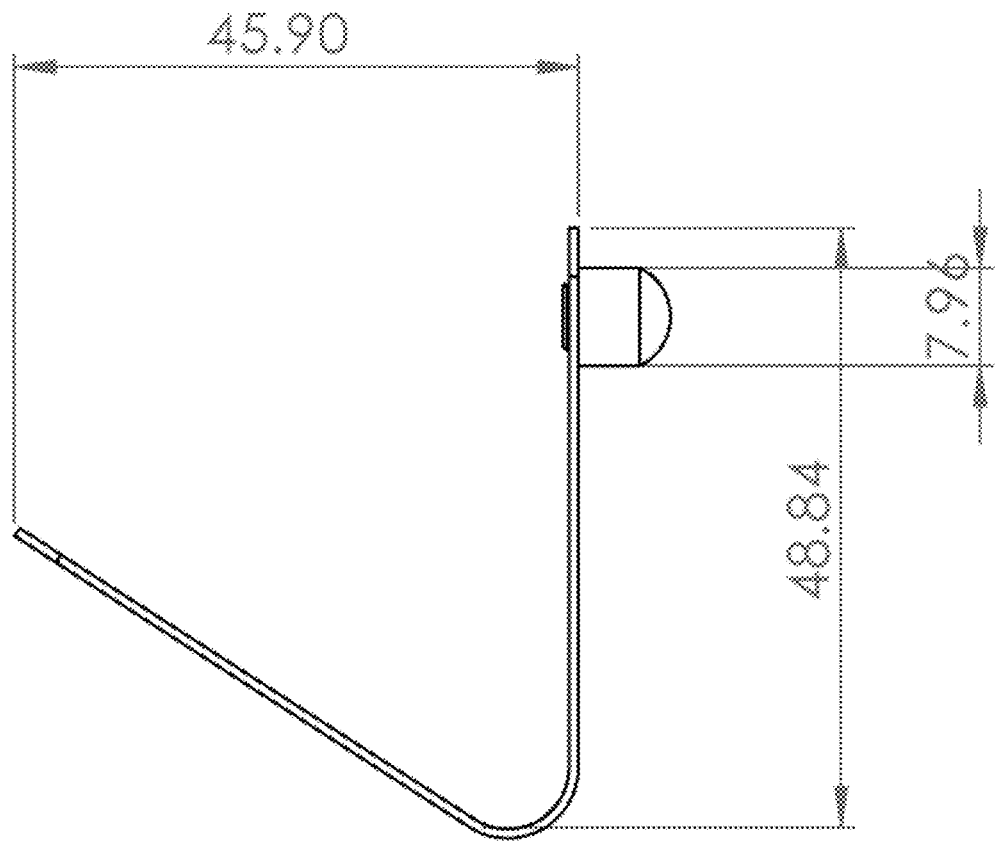
FIG. 24 shows the line-cutting component of FIG. 22, from another side view.
Figure 25:
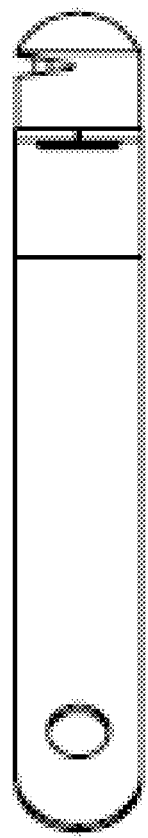
FIG. 25 shows the line-cutting component of FIG. 22, from another side view.
Figure 26:
FIG. 26 shows the line-cutting component of FIG. 22, from another side view.
Figure 27:
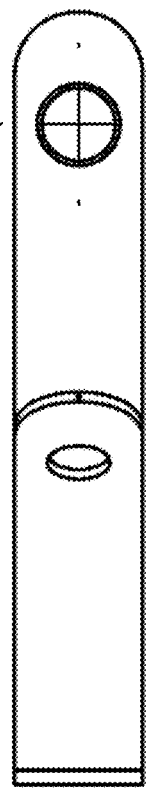
FIG. 27 shows the line-cutting component of FIG. 22, from another side view.

FIGS. 21-28 show examples of a line cutter incorporated into a spring clip, such as a spring clip that can be used to secure in a removable fashion the tubes of a multi-piece paddle (e.g. a kayak paddle, stand-up paddle board paddle, or other multi-piece paddle). As illustrated in FIG. 22, the spring clip includes a pair of spring arms 20, 22, an opening 24, and a pin head 26. The opening 24 may receive a fastener to secure the spring clip inside the tube of a paddle. The spring clip may be positioned inside of the paddle tube so that the pin head 26 of the spring clip passes through an opening in the paddle tube so that the pin head can be depressed into the opening and will spring back when released. When two paddle tubes are connected, the pin head may extend through openings in both tubes to connect them together, and may be depressed to allow one tube to be removed from another.

Figure 28:
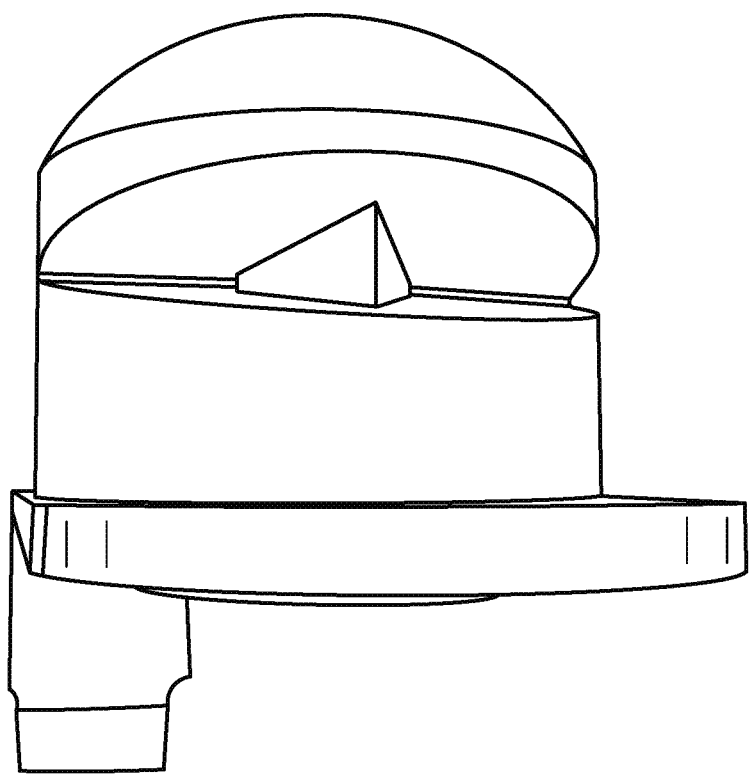
FIG. 28 shows a close up of the line cutter head of the line-cutting component of FIG. 22.

As shown in FIGS. 21 and 28, the pin head includes an opening and a cutter positioned within the opening, allowing the cutting of fishing line or other items in a similar fashion to the line-cutting trim components described above.

The line-cutting components shown in the figures may be made by injection molding a plastic housing around a metal cutter, or in any other desirable manner.

FIGS. 1-28 show non-limiting examples of our invention, and are not intended to limit the scope of this patent in any way. Changes and modifications can be made to the examples shown in FIGS. 1-28 and described above while still embodying our invention.

The invention claimed is:
1. A garment, comprising:
(a) a garment body; and
(b) a garment trim secured to the garment body, the garment trim comprising:
   (i) a housing, comprising an outer surface facing away from the garment body, an inner surface facing toward the garment body, and a perimeter surface extending between the outer surface and the inner surface;
   (ii) an opening extending into the housing, wherein the perimeter surface has a first side and a second side that taper with respect to one another and define two sides of the opening; and
   (iii) a line cutter connected to the first side of the perimeter surface and extending at least partially into the opening such that a cutting edge of the line cutter faces the second side of the perimeter surface.

2. The garment of claim 1, wherein the opening is wedge shaped.

3. The garment of claim 1, wherein the opening is formed in the outer, inner, and perimeter surfaces.

4. The garment of claim 1, wherein the garment trim is sewn to the garment body.

5. The garment of claim 4, wherein the garment trim is sewn to the garment body by a fabric loop sewn into the garment body, the fabric loop extending through an elongated opening extending through the garment trim.

6. The garment of claim 4, wherein the garment trim housing includes at least two holes where the garment trim is sewn to the garment body.

7. The garment of claim 6, wherein the line cutter is located between the two holes.

8. The garment of claim 1, wherein the garment trim is secured to the garment body by a button, tack or rivet.

9. The garment of claim 1, wherein the garment trim is a shank button configured to fit through a button hole in the garment.

10. The garment of claim 9, wherein the shank button comprises a post extending from the inner surface and through a portion of the garment body.

11. A garment, comprising:
(a) a garment body, the garment body comprising a button hole formed in a first portion of the garment body; and
(b) a shank button secured to a second portion of the garment body, the shank button comprising:
   (i) a housing;
   (ii) an opening extending into the housing;
   (iii) a line cutter at least partially extending into the opening; and
   (iv) a shank configured to secure the shank button to the portion of the garment body;
wherein the housing is sized to be passed through the button hole.

12. The garment of claim 11, wherein the shank button is configured to secure the first portion of the garment body to the second portion of the garment body.

13. The garment of claim 11, wherein the housing comprises a body of the shank button.

* * * * *